(12) United States Patent
Maier et al.

(10) Patent No.: US 7,993,792 B2
(45) Date of Patent: *Aug. 9, 2011

(54) POLYMER BLOCKS FOR PEM APPLICATIONS

(75) Inventors: Gerhard Maier, Munich (DE); Markus Gross, Kaufbeuren (DE)

(73) Assignee: GM Global Technology Operations LLC, Detroit, MI (US)

( * ) Notice: Subject to any disclaimer, the term of this patent is extended or adjusted under 35 U.S.C. 154(b) by 1413 days.

This patent is subject to a terminal disclaimer.

(21) Appl. No.: 11/459,970

(22) Filed: Jul. 26, 2006

(65) Prior Publication Data

US 2008/0027151 A1    Jan. 31, 2008

(51) Int. Cl.
*H01M 8/10* (2006.01)

(52) U.S. Cl. ........ 429/492; 429/491; 429/493; 429/494; 429/479; 521/25; 521/27

(58) Field of Classification Search .................. 429/477, 429/479, 491, 492, 494, 493; 521/25, 27
See application file for complete search history.

(56) References Cited

U.S. PATENT DOCUMENTS

| | | | |
|---|---|---|---|
| 4,331,746 A | 5/1982 | Sheibley | |
| 5,468,574 A | 11/1995 | Ehrenberg et al. | |
| 5,677,074 A | 10/1997 | Sperico et al. | |
| 6,579,948 B1 | 6/2003 | Tan et al. | |
| 6,630,265 B1 | 10/2003 | Taft, III et al. | |
| 6,671,989 B2 | 1/2004 | Vanek et al. | |
| 6,761,989 B2 | 7/2004 | Terahara et al. | |
| 7,459,505 B2 * | 12/2008 | Maier et al. ................ | 525/535 |
| 2001/0041279 A1 | 11/2001 | Terahara | |
| 2002/0155333 A1 | 10/2002 | Fitts et al. | |
| 2002/0160271 A1 | 10/2002 | Frech et al. | |
| 2002/0187377 A1 | 12/2002 | Shinoda et al. | |
| 2003/0013817 A1 | 1/2003 | Lu | |
| 2003/0031911 A1 | 2/2003 | Ritts et al. | |
| 2003/0044669 A1 | 3/2003 | Hidaka et al. | |
| 2003/0049511 A1 | 3/2003 | Ritts et al. | |
| 2003/0104280 A1 | 6/2003 | Venkatesan et al. | |
| 2003/0198858 A1 | 10/2003 | Sun et al. | |
| 2003/0219640 A1 | 11/2003 | Nam et al. | |
| 2003/0222048 A1 | 12/2003 | Asakawa et al. | |
| 2004/0005474 A1 | 1/2004 | Charnock et al. | |
| 2004/0005490 A1 | 1/2004 | Fan et al. | |
| 2004/0202908 A1 | 1/2004 | Schmitz et al. | |
| 2004/0038107 A1 | 2/2004 | Fan et al. | |
| 2004/0050816 A1 | 3/2004 | Asakawa et al. | |
| 2004/0101730 A1 | 5/2004 | Hirano et al. | |
| 2004/0126666 A1 | 7/2004 | Cao et al. | |
| 2004/0138387 A1 | 7/2004 | Terahara et al. | |
| 2004/0186262 A1 | 9/2004 | Maier et al. | |

FOREIGN PATENT DOCUMENTS

| | | |
|---|---|---|
| CA | 2 392 241 A1 | 1/2003 |
| CA | 2 415 355 A1 | 1/2003 |
| CA | 2 470 123 A1 | 6/2003 |
| CA | 2 470 125 A1 | 6/2003 |
| DE | 101 49 716 A1 | 4/2003 |
| DE | 103 26 703 A1 | 2/2004 |
| EP | 1 113 517 A2 | 7/2001 |
| EP | 1 274 142 A2 | 1/2003 |
| EP | 1 274 147 A2 | 1/2003 |
| EP | 1 431 281 A1 | 6/2004 |
| FR | 2 811 323 A1 | 7/2000 |
| GB | 1 035 242 | 7/1966 |
| GB | 2 395 952 A | 6/2004 |
| JP | 08020704 | 3/1996 |
| WO | WO 97/50143 A1 | 12/1997 |
| WO | WO 00/05774 A1 | 2/2000 |
| WO | WO 01/19896 A1 | 3/2001 |
| WO | WO 01/70858 A2 | 9/2001 |
| WO | WO 02/05370 A1 | 1/2002 |
| WO | WO 02/087001 A2 | 10/2002 |
| WO | WO 03/030289 A2 | 4/2003 |
| WO | WO 03/050897 A2 | 6/2003 |
| WO | WO 03/054995 A1 | 7/2003 |
| WO | WO 03/097718 A1 | 11/2003 |
| WO | WO 03/097719 A1 | 11/2003 |
| WO | WO 2004/035662 A1 | 4/2004 |
| WO | WO 2004/042839 | 5/2004 |

OTHER PUBLICATIONS

Feng Wang, Taianlu Chen, Jiping Xy, "Sodium Sulfonate—Functional Poly (ether ketone) s", Macromol, Chem Phys. 199, 1421-1426 (1998).

* cited by examiner

*Primary Examiner* — Jane Rhee
(74) *Attorney, Agent, or Firm* — Brooks Kushman P.C.

(57) ABSTRACT

Block copolymer that can be formed into an ion—Conductive membrane are provided. The block copolymer of the invention includes a first polymer block and a second polymer block attached to the first polymer block. The second polymer block has a main polymer chain and one or more side chains extending from the main polymer chain. The one or more side chains include at least one substitutent for proton transfer. Block copolymers utilizing phosphoric acid groups are also provided.

12 Claims, No Drawings

POLYMER BLOCKS FOR PEM APPLICATIONS

BACKGROUND OF THE INVENTION

1. Field of the Invention

The present invention relates to block copolymers that can be formed into ion conductive membranes for fuel cell applications.

2. Background Art

Fuel cells are used as an electrical power source in many applications. In particular, fuel cells are proposed for use in automobiles to replace internal combustion engines. In proton exchange membrane ("PEM") type fuel cells, hydrogen is supplied to the anode of the fuel cell and oxygen is supplied as the oxidant to the cathode. The oxygen can be either in a pure form ($O_2$) or air (a mixture of $O_2$ and $N_2$). PEM fuel cells typically have a membrane electrode assembly ("MEA") in which a solid polymer membrane has an anode catalyst on one face and a cathode catalyst on the opposite face. The MEA, in turn, is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

In order to efficiently produce electricity, the polymer electrolyte membrane of a PEM fuel cell typically, must be thin, chemically stable, proton transmissive, non-electrically conductive, and gas impermeable. Moreover, during operation of the fuel cell, the PEM is exposed to rather severe conditions, which include, hydrolysis, oxidation and reduction (hydrogenation) that can lead to degradation of the polymer thereby reducing the lifetime of a polymer electrolyte membrane. The combination of these requirements imposes rather strict limitations on material choices for these membranes. Presently, there are relatively few polymer systems that provide even marginally acceptable results for the combination of these requirements. An example of a PEM is the Nafion membrane developed by DuPont in 1966 as a proton conductive membrane. This membrane is possibly the only advanced polymer electrolyte currently available for use in a membrane electrode assembly in a fuel cell.

Other polymer systems that may be used in PEM applications are found in U.S. Pat. No. 4,625,000 (the '000 patent), U.S. Pat. No. 6,090,895 (the '895 patent), and EP Patent No. 1,113, 517 A2 (the '517 patent). The '000 discloses a sulfonation procedure forming poly(ether sulfone)s that may be used in solid polymer electrolyte application. However, the '000 patent's post-sulfonation of preformed polymers offers little control of the position, number, and distribution of the sulfonic acid groups along the polymer backbone. Moreover, the water uptake of membranes prepared from post sulfonated polymers increases, leading to large dimensional changes as well as a reduction in strength as the degree of sulfonation increases.

The '895 patent discloses a process for making cross linked acidic polymers of sulfonated poly(ether ketone)s, sulfonated poly(ether sulfone)s, sulfonated polystyrenes, and other acidic polymers by cross linking with a species which generates an acidic functionality. However, this reference does not suggest an effective way to cast membranes from those cross linked sulfo-pendent aromatic polyethers.

The '517 patent discloses a polymer electrolyte containing a block copolymer comprising blocks having sulfonic acid groups and blocks having no sulfonic acid groups formed by post sulfonation of precursor block copolymers consisting of aliphatic and aromatic blocks. In this patent, the precursor block copolymers are sulfonated using concentrated sulfuric acid, which leads to the sulfonation of aromatic blocks. However, once again, this post sulfonation of aromatic blocks offers the little control of the position, number, and distribution of the sulfonic acid groups along the polymer backbone. Furthermore, this post sulfonation of precursor block copolymers also leads to the cleavage of chemical bonds of the aliphatic block.

Although some of the proton conducting membranes of the prior art function adequately in hydrogen fuel cells, these membranes tend to require high humidity (up to 100% relative humidity) for efficient long-term operation. Moreover, prior art membranes are not able to efficiently operate at temperatures above 80° C. for extended periods of time. This temperature limitation necessitates that these membranes be constantly cooled and that the fuel (i.e., hydrogen) and oxidant be humidified.

Accordingly, there exists a need for improved materials for forming polymer electrolyte membranes and for methods of forming such materials.

SUMMARY OF THE INVENTION

The present invention overcomes the problems encountered in the prior art by providing in one embodiment a block copolymer that can be formed into an ion-conductive membrane. The block copolymer of this embodiment is characterized by having alternating hydrophobic and hydrophilic polymer blocks. Specifically, the block copolymer of this embodiment includes a first polymer block (i.e., a hydrophobic polymer block) and a second polymer block (i.e., a hydrophilic polymer block) attached to the first polymer block. The second polymer block has a main polymer chain and one or more side chains extending from the main polymer chain (i.e., spacers). The one or more side chains include at least one substitutent for proton transfer. Typically, the substitutent for proton transfer is an acid group or a salt of an acid group. The presence of these acidic groups on spacers within the hydrophilic segments allows the acidic groups to arrange themselves in orientations suitable for proton dissociation at low water levels through neighbor-group interactions.

In another embodiment of the invention, an ion conducting membrane incorporating the block copolymers of the invention is provided. The ion conducting membrane is advantageously useable in a fuel cell, and in at least one embodiment, a hydrogen fuel cell, operating continuously at temperatures up to about 120° C. Membranes formed from the block copolymers of the invention are characterized by having a microphase separated morphology due to the alternating hydrophobic and hydrophilic polymer sequences. Moreover, the ion conducting membranes of this embodiment have higher proton conductivities at low relative humidities than random copolymers of similar composition.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

The term "block" as used herein means a portion of a macromolecule, comprising many constitutional units, that has at least one feature that is not present in adjacent portions.

The term "block macromolecule" as used herein means a macromolecule that is composed of blocks in linear sequence.

The term "block polymer" as used herein means a substance composed of block macromolecules.

The term "block copolymer" as used herein means a polymer in which adjacent blocks are constitutionally different, i.e., each of these blocks comprise constitutional units derived from different characteristic species of monomer or with different composition or sequence distribution of constitutional units.

The term "random copolymer" as used herein means a copolymer consisting of macromolecules in which the probability of finding a given repeating unit at any given site in the chain is independent of the nature of the adjacent units.

In one embodiment, the present invention provides a block copolymer that can be formed into an ion-conductive membrane. In particular, block copolymers of the invention are particularly useful for forming ion conductive membranes to be used in PEM fuel cells. The block copolymers of the invention are characterized by having a sequence of alternating hydrophobic and hydrophilic blocks. These alternating segments are immiscible thereby inducing a microphase separated morphology in films cast from these materials. The block copolymer of the invention includes a first polymer block and a second polymer block attached to the first polymer block. In a variation of the present embodiment, the second polymer block has a main polymer chain and one or more side chains (i.e., spacers) extending from the main polymer chain. Each of the one or more side chains include at least one substituent for proton transfer.

In an embodiment of the invention, a block copolymer for use as a solid polymer electrolyte is provided. The block copolymer of this embodiment comprises a polymer having formula 1a or formula 1b:

$$(A_m B_n)_p \qquad \qquad 1a$$

$$A_m B_n C_s \qquad \qquad 1b$$

wherein
A is a first polymer segment that is repeated m times to form first polymer block $A_m$ that is either hydrophobic or hydrophilic;
B is a second polymer segment that is repeated n times to form second polymer block $B_n$ that is either hydrophobic or hydrophilic;
C is a third polymer segment that is repeated s times to form third polymer block $C_p$ that is either hydrophobic or hydrophilic; and
m, n, p, s are each independently an integer. In one variation, m, n, s are each independently integer from about 1 to 300. In another variation, m, n, s are each independently an integer from about 1 to 200. In yet another variation, m, n, s are each independently an integer from about 10 to 200. Similarly, in one variation, p is an integer from about 1 to about 20. In another variation, p is an integer from about 1 to 10.

The block copolymer described by formula 1a is further limited by the proviso that when A is hydrophobic, B is hydrophilic. Similarly, when A is hydrophilic, B is hydrophobic. Consistent with these two provisos, when A is hydrophilic, A includes a first substituent for proton transfer and when B is hydrophilic, B includes a second substituent for proton transfer wherein at least one of A and B is hydrophilic and includes at least one substituent for proton transfer. The block copolymer described by formula 1b is further limited by the proviso that when A is hydrophobic, B is hydrophilic and C is hydrophobic. Similarly, when A is hydrophilic, B is hydrophobic and C is hydrophilic. Consistent with these two provisos, when A is hydrophilic, A includes a first substituent for proton transfer, when B is hydrophilic, B includes a second substituent for proton transfer, and when C is hydrophilic, C includes a third substituent for proton transfer wherein at least one of A, B, and C is hydrophilic and includes at least one substituent for proton transfer.

In a variation, at least one of A, B, or C is hydrophilic and has a main polymer chain and one or more side chains extending from the main polymer chain. Each of the side chains includes at least one substituent for proton transfer. It has been discovered that the block copolymer of this embodiment is formable into an ion-conductive membrane that is useful for fuel cell applications, and in particular, for fuel cells operating at temperatures as high as 120° C.

At least one or A, B, or C is hydrophilic and includes at least one substituent for proton transfer. In a variation of this embodiment, such substituents for proton transfer include acidic substitutents and salts thereof. Salts in this context are salts of the conjugate bases to an acidic substituent. Examples of suitable substituents for proton transfer are sulfonic and phosphonic acid groups and salts thereof which include, but are not limited to, —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, —PO$_3^{2-}$M$^{2+}$, and combinations thereof. In these examples, M is a metal such as an alkali or alkaline-earth metal, ammonium, or alkylammonium. Particularly useful metals are sodium, potassium, lithium, and the like.

In an embodiment of the present invention, at least one or A, B, or C is hydrophilic and described by formula 2:

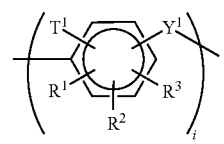

2 wherein:
Y$^1$ is —O—, —S—, —CO—, —SO$_2$—, —C(CH$_3$)$_2$—, —C(CF$_3$)$_2$—, —P(O)(T$^1$)-, —C(CH$_3$)(T$^1$)-, —P(O)(R$^4$)—, diphenyl methylene, diphenyl silicon, fluorenyl, an alkylene, a single chemical bond, or

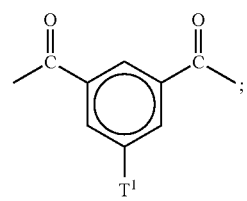

R$^1$, R$^2$, and R$^3$ are each independently H, C$_{1-10}$ alkyl, C$_{6-18}$ aryl, C$_{6-18}$ aralkyl, SO$_3$H, —SO$_3^-$M$^+$, —COOH, —COO$^-$M$^+$, —PO$_3$H$_2$, —PO$_3$H$^-$M$^+$, or —PO$_3^{2-}$M$_2^+$, —PO$_3^{2-}$M$^{2+}$;
R$^4$ is H, C$_{1-10}$ alkyl, C$_{6-18}$ aryl, or C$_{6-18}$ aralkyl;
i is an integer from 1 to 6; and
T$^1$ is H or a moiety having formula 3:

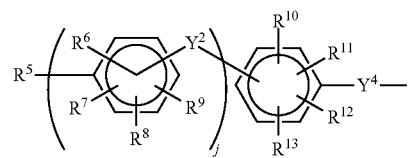

3 wherein:
Y² and Y⁴ are each independently —O—, —S—, —CO—, —SO₂—, —C(CH₃)₂—, —C(CF₃)₂—, —P(O)(R⁴)—, diphenyl methylene, diphenyl silicon, fluorenyl, an alkylene, or a bond;
R⁴ is H, C₁₋₁₀ alkyl, C₆₋₁₈ aryl, or C₆₋₁₈ aralkyl;
R⁵, R⁶, R⁷, R⁸, R⁹, R¹⁰, R¹¹, R¹², and R¹³ are each independently H, C₁₋₁₀ alkyl, C₆₋₁₈ aryl, C₆₋₁₈ aralkyl, SO₃H, —SO₃⁻M⁺, —COOH, —COO⁻M⁺, —PO₃H₂, —PO₃H⁻M⁺, —PO₃²⁻M₂⁺, or —PO₃²⁻M²⁺;
M is a metal, ammonium, or alkylammonium; and
j is an integer from 0 to 30.

The spacer having formula 3 is further limited by the proviso that when j>1, the Y² between sequential aromatic rings are the same or different; the R⁵, R⁶, R⁷, R⁸, and R⁹ on sequential aromatic rings are the same or different; and at least one of R⁵, R⁶, R⁷, R⁸, R⁹, R¹⁰, R¹¹, R¹², and R¹³ is —SO₃H, —SO₃⁻M⁺, —COOH, —COO⁻M⁺, —PO₃H₂, —PO₃H⁻M⁺, —PO₃²⁻M₂⁺, or —PO₃²⁻M²⁺.

The polymer segment having formula 2 is further limited with the proviso that when i>1, the Y¹ between sequential aromatic rings are the same or different; the T¹ on sequential aromatic rings are the same or different; the R¹, R², and R³ on sequential aromatic rings are the same or different; and T¹ is a moiety having at least one substituent for proton transfer for at least one aromatic ring in B. Suitable substituents for proton transfer include SO₃H, —SO₃⁻M⁺, —COOH, —COO⁻M⁺, —PO₃H₂, —PO₃H⁻M⁺, or —PO₃²⁻M₂⁺, —PO₃²⁻M²⁺ as defined above. The presence of a phosphonic acid group or related salt (i.e., —PO₃H₂, —PO₃H⁻M⁺, —PO₃²⁻M₂⁺, or —PO₃²⁻M²⁺) is particularly useful in T¹ or in R¹, R², and R³. Since phosphonic acid is a dibasic acid with a weakly dissociating second acid group, an alternative mechanism for proton transport, which is not possible in monobasic acids such as sulfonic acid, is available. Moreover, this mechanism is expected to operate even at low water contents than when monobasic acids are used. Accordingly, such polymers exhibit higher proton conductivity at lower humidity and water content than polymers of similar structure with sulfonic acid groups. Although the beneficial effects of using phosphonic acid groups are not limited to any particular mechanism, the proton transport mechanism in the presence of phosphonic acid groups is believed to be a Grotthus mechanism that operates through chains of hydrogen bonds thereby requiring a non-dissociated group. In a variation of this embodiment, at least one of R¹, R², and R³ is —PO₃H₂, —PO₃H⁻M⁺, —PO₃²⁻M₂⁺, or —PO₃²⁻M²⁺.

In a variation of the invention, the block $A_m$ has a molecular weight from about $5 \times 10^2$ to about $5 \times 10^5$ (g/mol), $B_n$ has a molecular weight from about $5 \times 10^2$ to about $5 \times 10^5$ (g/mol), and polymer block $C_s$ has a molecular weight from about $5 \times 10^2$ to about $5 \times 10^5$ (g/mol).

As set forth above, formula 2 provides examples of hydrophilic blocks. Specific examples when at least one or A, B, or C is hydrophilic (i.e., forms hydrophilic blocks) are given by formulae 4 through 6 and salts thereof:

4. 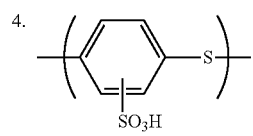

5. 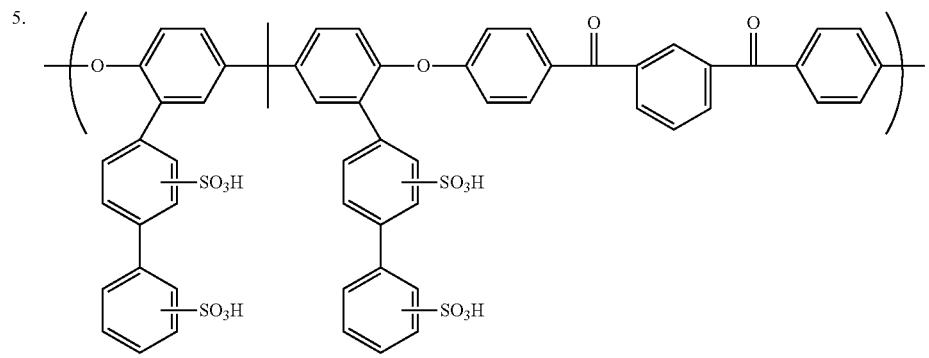

6a. 

6b. 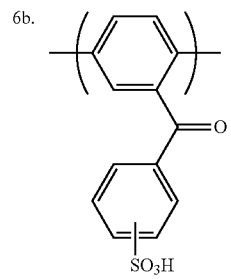

6c.
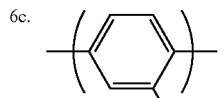

6d.
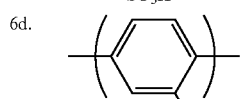

6e.
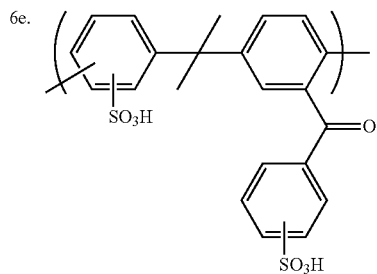

Similarly, examples of when at least one or A, B, or C is hydrophobic are described by formula 7:

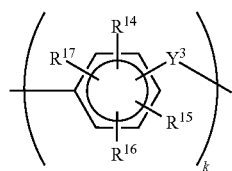
7 wherein:
Y$^3$ is —O—, —S—, —CO—, —SO$_2$—, —C(CH$_3$)$_2$—, —C(CF$_3$)$_2$—, —P(O)(T$^1$)-, —C(CH$_3$)(T$^1$)-, —P(O)(R$^4$)—, diphenyl methylene, diphenyl silicon, fluorenyl, an alkylene, a bond single chemical bond, or

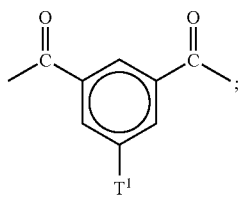

R$^4$ is H, C$_{1-10}$ alkyl, C$_{6-18}$ aryl, or C$_{6-18}$ aralkyl;
T$^1$ is H or a moiety having at least one substitutent for proton transfer;
R$^{14}$, R$^{15}$, R$^{16}$, and R$^{17}$ are each independently H, C$_{1-18}$ alkyl, C$_{6-18}$ aryl, or C$_{6-18}$ aralkyl; and
k is an integer from 1 to 6.

Polymer segment having formula 7 is further limited by the proviso that when k>1, the Y$^3$ between sequential aromatic rings are the same or different and the R$^{14}$, R$^{15}$, R$^{16}$, and R$^{17}$ on sequential aromatic rings are the same or different.

As set forth above, formula 7 provides examples of hydrophobic blocks. Specific examples when at least one or A, B, or C is hydrophobic are provided by formulae 8 through 11 and salts thereof:

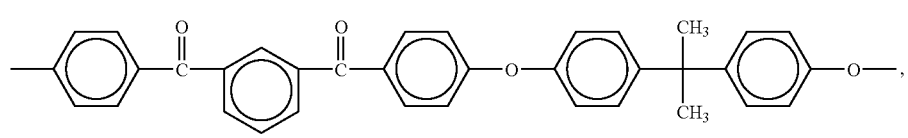

8

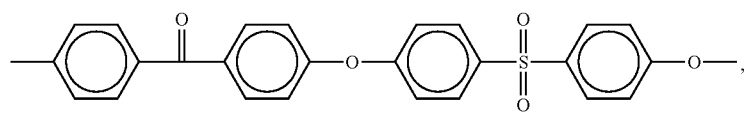

9

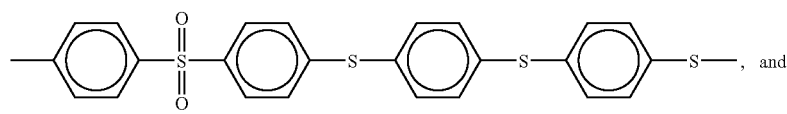

10

, and

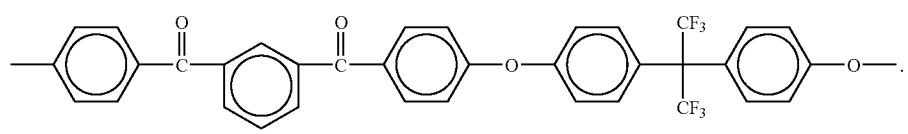

11

In another embodiment of the invention, the block copolymers set forth above are used to form an ion conductive membrane. As set forth above, the block copolymers of the invention are characterized by having alternating hydrophobic and hydrophilic polymer blocks that induce a microphase separated morphology when the polymers are formed into films. Due to this microphase separated morphology, the polymer segments with acidic groups are associated in hydrophilic domains that contain essentially no hydrophobic segments. Moreover, the local concentration of acidic groups in the hydrophobic domains is higher than in a randomly sulfonated polymer such as SPEEK. Also, water taken up by membranes will be present only in the hydrophilic domains and not in hydrophobic domains. Therefore, at a given overall IEC value and water content, the block copolymers will contain a higher local IEC and water level within the hydrophilic domains than compared to random copolymers. The microphase separated morphology includes, for example, morphologies such as spheres, cylinders, lamellae, ordered bi-continuous double diamond structures, and combinations thereof. The method of making such membranes begins first with preparation of the block copolymers of the present invention. In a variation of the invention a first polymer having formula 12 is prepared:

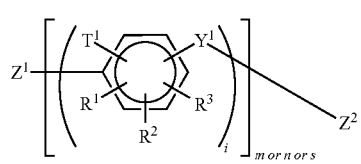

12 wherein $Z_1$ and $Z_2$ are each independently —H, $C_{1-10}$ alkyl, cycloalkyl, $C_{6-18}$ aryl, $C_{6-18}$ aralkyl, —SH, —S(O)N($R^{18}$)$_2$, F, Cl, Br, I, —NO$_2$, or —OH; and $R^{18}$ is H, $C_{1-10}$ alkyl, cycloalkyl, $C_{6-18}$ aryl, or $C_{6-18}$ aralkyl; and $T^1$, $R^1$, $R^2$, $R^3$, $Y^1$ and i are the same as set forth above. Similarly, an end functionalized second polymer block having formula 13 is also synthesized:

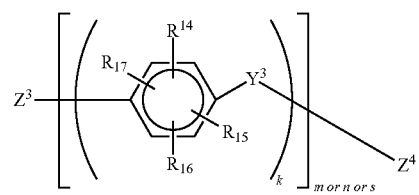

13 wherein $Z^3$ and $Z^4$ are each independently —H, $C_{1-10}$ alkyl, cycloalkyl, $C_{6-18}$ aryl, or $C_{6-18}$ aralkyl, —SH, —S(O)N($R^{18}$)$_2$, F, Cl, Br, I, —NO$_2$, or —OH; and $R^{18}$ is H, $C_{1-10}$ alkyl, cycloalkyl, $C_{6-18}$ aryl, or $C_{6-18}$ aralkyl; and $R^{14}$, $R^{15}$, $R^{16}$, $R^{17}$, $Y^3$, m, n, s, and k are the same as those set forth above. The block copolymers in at least some embodiments of the invention are then prepared by reacting polymer block having formula 12 with polymer block having formula 13.

In another variation of the invention, the polymer block having formula 13 is reacted with one or more monomers suitable for forming the polymer block having formula 12. Specifically, the block copolymers of the invention having formula 1 are prepared by synthesizing an end-functionalized polymer block having formula 13:

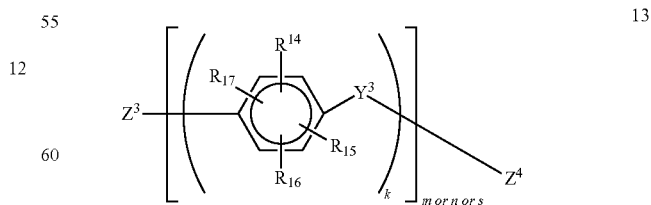

13 wherein $R^{14}$, $R^{15}$, $R^{16}$, $R^{17}$, $Y^3$, m, n, s and k are the same as set forth above; $Z^3$ and $Z^4$ are each independently —H, $C_{1-10}$ alkyl, cycloalkyl, $C_{6-18}$ aryl, or $C_{6-18}$ aralkyl, —SH, —S(O)N($R^{18}$)$_2$, F, Cl, Br, I, —NO$_2$, or —OH; and $R^{18}$ is H, $C_{1-10}$ alkyl, cycloalkyl, $C_{6-18}$ aryl, or $C_{6-18}$ aralkyl. In this embodiment, the polymer block having formula 13 is then reacted with one or more monomers that polymerize into a block having formula 2:

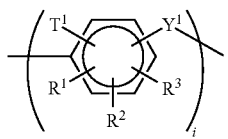

to form the block copolymer having formula 1, wherein $R^1$, $R^2$, $R^3$, $Y^1$, $T^1$ and i are the same as set forth above.

In yet another variation of this embodiment, the polymer block having formula 12 is reacted with one or more monomers suitable for forming the polymer block having formula 13. Specifically, the block copolymers in at least some embodiments of the invention are formed by synthesizing an end-functionalized polymer block having formula 12:

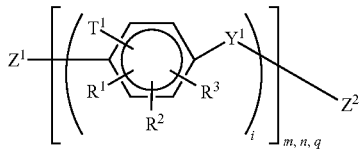

wherein $R^1$, $R^2$, $R^3$, $Y^1$, $T^1$, and i are the same as set forth above; $Z^1$ and $Z^2$ are each independently —H, $C_{1-10}$ alkyl, cycloalkyl, $C_{6-18}$ aryl, or $C_{6-18}$ aralkyl, —SH, —S(O)N$(R^{18})_2$, F, Cl, Br, I, —NO$_2$, or —OH; and $R^{18}$ is H, $C_{1-10}$ alkyl, cycloalkyl, $C_{6-18}$ aryl, or $C_{6-18}$ aralkyl. In the embodiment, the polymer block having formula 12 is then reacted with one or more monomers that polymerize into a block having formula 7:

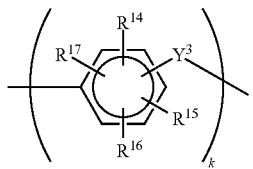

to form the block copolymer having formula 1, wherein $R^{14}$, $R^{15}$, $R^{16}$, $R^{17}$, $Y^3$, and k are the same as set forth above.

In an example of the preparation of the block copolymer of at least some embodiments of the invention, hydrophobic block having formula 13 is synthesized using one or more non-sulfonated bis-functional monomers. Such bis-functional monomer typically includes two groups that are halogens (F, Cl, Br, I) and OH. The molecular mass (i.e. which is proportional to the number of repeating units) of the block is adjusted by using a defined stoichiometric ratio between the difunctional monomers preferably in the range of 1:2 to 200:1, and/or by the addition of a mono-functional monomer in a corresponding ratio. After the reaction is completed the hydrophobic block is isolated by precipitation in a solvent such as methanol. Next the hydrophobic block is washed with excess amounts of the solvent (i.e., methanol) and subsequently with water. The dried hydrophobic block is used for the preparation of the multiblock copolymer together with the sulfonated monomers. Next, the dried hydrophobic first block is reacted with one or more monomers that include at least one substitutent for proton transfer. In one variation, the monomer that includes at least one substitutent for proton transfer is on a side chain as set forth above. In another variation, the monomer that includes at least one substitutent for proton transfer is a —PO$_3$H$_2$, —PO$_3$H$^-$M$^+$, —PO$_3^{2-}$M$_2^+$, or —PO$_3^{2-}$M$^{2+}$. Optionally, one or more additional bis-functional monomers that may or may not include substitutents for proton transfer are also reacted with the monomer that does include a substitutent for proton transfer. In at least one embodiment, in order to adjust the composition of the multiblock copolymer the necessary ratio between the monomers building the hydrophilic block and the hydrophobic block is used. The polymer is isolated by precipitation and purified in the same manner by precipitation into alcohol as for the hydrophobic blocks but without washing with water since the multiblocks especially when having a large hydrophilic block swell when in contact with water which results in difficulties in filtering the polymer. The resulting polymer flakes are thoroughly dried.

Regardless of the method by which the block copolymers of the invention are formed, the block copolymers are eventually formed or cast into an ion conductive membrane suitable for fuel cell applications. The polymer can be cast from solution in its acid, acid halide or salt form. In addition, a membrane can also be formed by hot pressing or by melt extrusion of the polymer. The behavior of the polymer during hot pressing or during melt extrusion can be improved by transferring the acidic groups in the polymer into ester groups or other protective groups, which can be returned into acid groups after melt processing. In one variation, the acid groups of the block copolymer are transformed to acid halide groups to form a modified block copolymer. Then a film is cast from a solution of the modified block copolymer onto a substrate. Finally, the acid halide groups are transformed back into the acid groups to form the ion conductive membrane. After formation of the multiblock copolymers of the present invention, ion conductive membranes can be formed. In a first refinement of this embodiment, the dried polymer is dissolved in a suitable solvent (i.e., DMSO). The polymer solution is then poured into a Petri dish and is covered with a lid in such a way that there is a small gap between the dish and the lid to allow for slow evaporation of the solvent. In another refinement, the dried polymer is also dissolved in a suitable solvent to form a viscous solution. The viscous solution is spread onto a glass plate and brought to a uniform thickness by means of a doctor blade. For both these refinements, the solvent is then removed by drying at elevated temperature in an oven. Finally, the morphology is adjusted by annealing the membrane at an elevated temperature. Typically, this annealing is performed at reduced pressures or in a vacuum. Useful annealing temperatures are either between the glass transition or melting temperatures of the two block types, or between the highest of the glass transition or melt temperatures of the two block types and the order-disorder transition temperature (if present). Temperatures between about 100° C. and 300° C. are useful with an optimal anneal temperature being about 200° C. In some variations of the invention, the after polycondensation steps, the multiblock copolymer of the invention is obtained a sulfonic acid salt or phosphorus acid salt. Therefore the membrane is converted into its free sulfonic acid form prior to use. This conversion is accomplished by containing the membranes with a diluted acid (e.g. 1 molar sulfuric acid) for 24 hours. Afterwards the membranes are rinsed thoroughly with DI water to remove excessive acid.

Ion conducting membranes formed by the polymers set forth in the examples can be characterized by the ion exchange capacity ("IEC"), water uptake, and specific conductivity.

Synthesis of Polymeric Blocks and Triblocks

1. Monomer Synthesis:

All monomers and end-cappers are synthesized by Friedel-Crafts acylation. A general method is described below for the monomer having formula 14a:

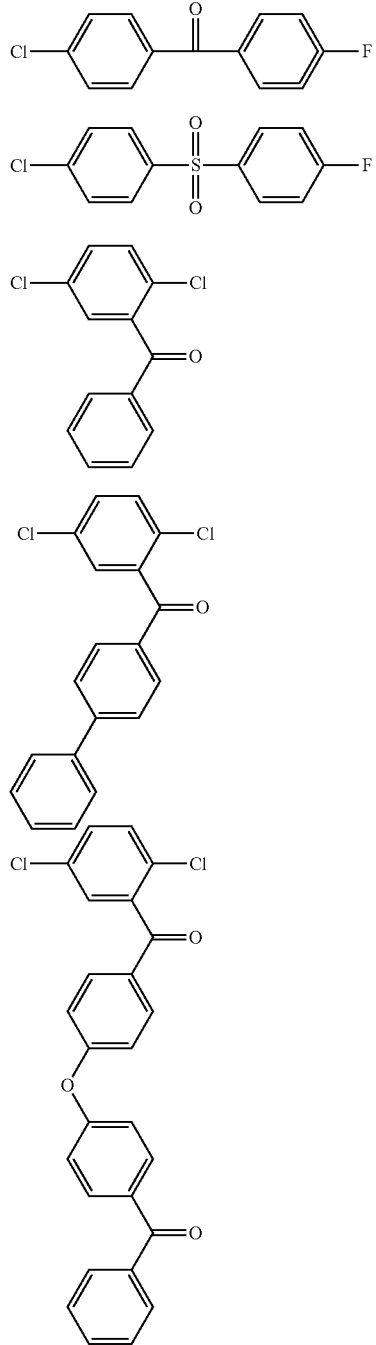

4-Fluorobenzoyl chloride (238 g, 1.5 mol) is added under an atmosphere of nitrogen over a period of 1 hour to a suspension of anhydrous aluminium chloride (224 g, 1.68 mol) and 700 ml of chloro-benzene while maintaining the temperature below 30° C. After the addition is complete, the solution is heated to 90° C. for 3 hours. The reaction solution is then added to 500 g crushed ice. The mixture is allowed to warm to room temperature and the water phase is extracted with dichloromethane (3×200 ml). The organic extracts are combined, washed with water (200 ml), saturated NaHCO$_3$ solution (200 ml), water (200 ml), dried over sodium sulphate, filtered, and evaporated to dryness. The residue is crystallized twice from petroleum ether to obtain a pale yellow powder of the monomer having formula 14a.

2. Synthesis of bis-fluoro-terminated poly-p-phenylenes:

A general procedure for the synthesis of the poly(2,5-benzophenone) designated as polymer 15a with a target molecular mass of 10.000 g/mol is described. About 13.28 g (52.89 mmol) of 2,5-Dichlorobenzophenone (formula 14c) and 0.54 g (2.00 mmol) of 4-chloro-4'-fluorodiphenylsulfone (formula 14b) are added together with 0.71 g (5.5 mmol) of nickel (II) chloride, 5.74 g (22.0 mmol) of triphenylphosphine, 0.85 g (5.5 mmol) of 2,2'-dipyridyl, 10.72 g (164 mmol) of zinc (99.998%, 100 mesh) and 200 ml of absolute NMP to a dried 500 ml two-necked flask equipped with a magnetic stir bar and a nitrogen inlet. NiCl$_2$ and Zn are dried in vacuum at about 100° C. and stored under nitrogen before usage. All components are added to the flask under a constant flow of nitrogen in order to allow for a oxygen and water free atmosphere. The mixture readily changed its color to dark red during stirring at room temperature. The temperature is raised to 80° C. After approximately 40 to 50 min the mixture became noticeably viscous. After approximately 4 hours the reaction is cooled down to room temperature and the mixture is precipitated in about 2000 ml of acetone. After filtration the precipitate is washed with diluted hydrochloric acid (5 vol %), water and acetone. The product is then dried at 80° C. in vacuum yielding polymer 15a. Polymers designated as polymer 15b and polymer 15c are prepared in an analogous manner. For the preparation of polymer 15b, the target molecular mass is 5,000 g/mol. In the preparation of polymer 15b, 0.94 g (4.01 mmol) of end-capper having formula 14a and 11.75 g (35.91 mmol) of the di-chloro-monomer having formula 14d are used. For the preparation of polymer 15c, the target molecular mass is 10,000 g/mol. In the preparation of polymer 15c, 0.54 g (2.00 mmol) of end-capper having formula 14b and 10.97 g (24.53 mmol) of the di-chloro-monomer having formula 14e are used.

3. Sulfonation of bis-fluoro-terminated poly-p-phenylenes:

A general procedure for the sulfonation of polymer 15a yielding oligomers with a high degree of sulfonation is now described. About 8.0 g of the bis-fluoro-terminated poly(2,5-benzophenone) (polymer 15a) and 50 ml of sulfuric acid containing about 30% free SO$_3$ are added to a 250 ml two-neck flask equipped with nitrogen inlet and outlet. The reaction mixture is stirred for about 240 min at room temperature. The solution is then added slowly to a mixture of 250 g ice, 250 ml water and 130 g Ca(OH)$_2$ under vigorous stirring. Additional Ca(OH)$_2$ is added until the pH is 5 to 7. The produced insoluble CaSO$_4$ is filtered off and washed with water. A K$_2$CO$_3$ solution is added to the resulting filtrate while no precipitate occurs. The precipitate of CaCO$_3$ is filtered off and washed with water. The water of the obtained filtrate is then distilled off and the resulting product is dried thoroughly at 80° C. in vacuum. The resulting polymer is a sulfonated bis-fluoro-terminated poly(2,5-benzophenone) designated to as polymer 16a. The sulfonation of 4.5 g of polymer 15b and 9.0 g of polymer 15c is conducted in an analogous manner to form polymers designated respectively as polymer 16 b-1 and polymer 16c.

Sulfonation with milder conditions results in polymers having the sulfonic acid groups only in the electron-rich aromatic rings. A procedure for the sulfonation of polymer 15b resulting in a lower degree of sulfonation is now described. About 4.0 g of polymer 15b are dissolved in 80 ml of concentrated sulfuric acid (96-98%). The solution is heated up to 50° C. and the temperature is held at that temperature for 24 hours. The reaction solution is then poured in to a mixture of 150 g ice and 150 ml water. The formed precipitate is filtered and washed with water and dried under vacuum at 100° C. until dry to give a polymer referred to as polymer 16b-2.

4. Synthesis of Hydrophobic Blocks:

4.1. Mono-hydroxy Terminated End-Blocks:

Mono-hydroxy terminated hydrophobic end-blocks (polymer 17a) (target Mn=20.500 g/mol and n=40 on average) are prepared according the following procedure. 2,2-Bis-(4-hydroxy-phenyl)-propane (46.498 g, 0.2037 mol), 1,3-Bis-(4-fluorobenzoyl)benzene (65.648 g, 0.2037 mol), m-cresol (0.5523 g, 0.0051 mol, purity: 99.7%), potassium carbonate (62.70 g, 0.4537 mol), 360 ml anhydrous N-methyl-pyrrolidone and 75 ml anhydrous cyclohexene are added to a 1000 ml flask equipped with a Dean-Stark trap, a reflux condenser, a nitrogen inlet and a mechanical stirrer. The mixture is refluxed at 100° C. for 3 hours under nitrogen atmosphere. Cyclohexene is removed, and the mixture is heated for another 20 hours at 170° C. The mixture is filtered, diluted with 150 ml NMP and 150 ml tetrahydrofurane and poured into 3 l methanol. The precipitated solid is washed with 1 l methanol, 1 l hot D. I. water and again with 1 l methanol and dried at 100° C. in vacuum to give a polymer designated as polymer 17a.

A polymer designated as polymer 17b with a target molecular mass of 20.100 g/mol (n=50) is prepared in an analogous manner to polymer 17a. About 43.759 g (0.235 mol) of biphenol, 67.483 g (0.235 mol) of 4,4'-dichlorodiphenylsulfone, 0.510 g (0.0047 mol, purity: 99.7%) of m-cresol, 72.33 g (0.523 mol) of potassium carbonate and 380 ml of anhydrous N-methyl-pyrrolidone are used to give polymer 17b.

4.2. Bis-hydroxy Terminated Hydrophobic Blocks:

Bis-hydroxy terminated hydrophobic blocks designated as polymer 17c with a target molecular mass of 5.000 g/mol (n=25) are prepared according the following procedure. Biphenol (24.206 g, 0.130 mol), 4,4'-dichlorodiphenylsulfone (34.459 g, 0.120 mol), potassium carbonate (41.46 g, 0.30 mol) and 250 ml NMP are added to a 500 ml flask equipped with a Dean-Stark trap, a reflux condenser, a nitrogen inlet and a mechanical stirrer. 40 ml of anhydrous cyclohexene is used as an azeotroping agent. The mixture is refluxed at 100° C. for 3 hours under nitrogen atmosphere. Cyclohexene is removed, and the mixture is heated for another 16 hours at 190° C. After cooling to room temperature the mixture is filtered and then poured into 3 l methanol. The precipitated solid is washed with methanol, hot D. I. water and again with methanol and dried at 100° C. in vacuum to yield polymer 17c.

5. Synthesis of Triblocks and MULTIBLOCKS:

A general procedure for the preparation of the triblock is described for example 1. A 20% excess of the hydroxy terminated hydrophobic block with respect to the fluorine content of the sulfonated PPP is used. After the synthesis of the triblock it is purified by means of a Soxhlett extraction in order to remove not coupled hydrophilic and hydrophobic blocks from the triblocks.

EXAMPLE 1 (TRIBLOCK 1)

About 20 g (≈1 mmol OH) of the mono-hydroxy terminated hydrophobic block (4a), 10 g (≈0.8 mmol F) of the bis-fluoro-terminated sulfonated PPP middle-block (3a) and 0.42 g (3 mmol) potassium carbonate, 200 ml anhydrous DMSO, 100 ml anhydrous NMP and 40 ml anhydrous cyclohexene are added to a 500 ml flask equipped with a Dean-Stark trap, reflux condenser, a nitrogen inlet and a mechanical stirrer. The mixture is refluxed at 100° C. for 2 hours under nitrogen. The cyclohexene is removed and the mixture is heated for further 12 h at 160° C. The mixture is filtered and acidified with concentrated HCl. The solution is poured into an excessive amount of methanol under vigorous stirring. The precipitated solid is washed with methanol and dried at 100° C. in vacuum. In order to remove not coupled hydrophobic and hydrophilic blocks the obtained polymer is purified by means of a Soxhlett extraction, first with $CHCl_3$ and subsequently with water. The purified product is dried again at 100° C. in vacuum yielding a triblock designated as polymer 18a. The block lengths m, n, s are defined by using the polymers described under 4.1 and 4.2.

Membranes of polymer 18a are prepared by casting from a NMP solution and drying at 120° C. in an oven. The membranes are proton exchanged by putting them into a 1 molar sulfuric acid for 24 hours and then washing them with D.I. water until the washing water is pH neutral.

EXAMPLE 2 (TRIBLOCK 2)

The preparation and purification is conducted in an analogous manner to the synthesis of example 1 using polymer 16b-1 as the hydrophilic middle block and polymer 17b as the hydrophobic block give a triblock designated as polymer 18b which is purified as set forth above.

Membranes of polymer 18b are prepared by casting from a NMP solution and drying at 120° C. in an oven. The membranes are proton exchanged by putting them into a 1 molar sulfuric acid for 24 hours and washing them with D.I. water until the washing water is pH neutral.

EXAMPLE 3 (TRIBLOCK 3)

The preparation and purification is conducted according to the procedure describe for example 1 using polymer 16c as the hydrophilic middle block and polymer 17a as the hydrophobic block to give a triblock designated as polymer 18c which is purified according to the procedure described above.

Membranes of (18c) are prepared by casting from a NMP solution and drying at 120° C. in an oven. The membranes are proton exchanged by putting them into a 1 molar sulfuric acid for 24 hours and washing them with D.I. water until the washing water is pH neutral.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A block copolymer having formula 1a or formula 1b:

$$(A_m B_n)_p \quad \text{1a}$$

$$A_m B_n C_s \quad \text{1b}$$

wherein

A is a first polymer segment that is repeated m times to form first polymer block $A_m$ that is either hydrophobic or hydrophilic;

B is a second polymer segment that is repeated n times to form second polymer block $B_n$ that is either hydrophobic or hydrophilic;

C is a third polymer segment that is repeated s times to form third polymer block $C_s$ that is either hydrophobic or hydrophilic;

at least one of A, B, and C is described by formula 2

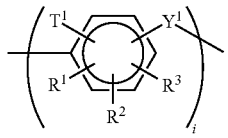
2

$Y^1$ is —O—, —S—, —CO—, —SO$_2$—, —C(CH$_3$)$_2$—, —C(CF$_3$)$_2$—, —P(O)(T$^1$)-, —C(CH$_3$)(T$^1$)-, —P(O)(R$^4$)—, diphenyl methylene, diphenyl silicon, fluorenyl, an alkylene, a bond single chemical bond, or

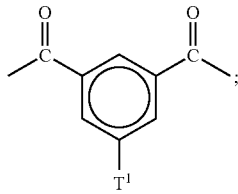

$R^1$, $R^2$, and $R^3$ are each independently H, $C_{1-10}$ alkyl, $C_{6-18}$ aryl, $C_{6-18}$ aralkyl, SO$_3$H, —SO$_3^-$M$^+$, —COOH, —COO$^-$M$^+$, —PO$_3$H$_2$, —PO$_3$H$^-$M$^+$, or —PO$_3^{2-}$M$_2^+$, —PO$_3^{2-}$M$^{2+}$;

$R^4$ is H, $C_{1-10}$ alkyl, $C_{6-18}$ aryl, or $C_{6-18}$ aralkyl;

m, n, and s are each independently an integer from 1 to 200;

p is an integer from 1 to 20;

i is an integer from 1 to 6;

$T^1$ is H or a moiety having formula 3:

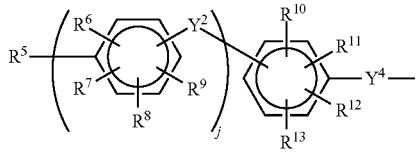
3

$Y^2$ and $Y^4$ are each independently —O—, —S—, —CO—, —SO$_2$—, —C(CH$_3$)$_2$—, —C(CF$_3$)$_2$—, —P(O)(R$^4$)—, diphenyl methylene, diphenyl silicon, fluorenyl, an alkylene, or a bond;

$R^4$ is H, $C_{1-10}$ alkyl, $C_{6-18}$ aryl, or $C_{6-18}$ aralkyl;

$R^5$, $R^6$, $R^7$, $R^8$, $R^9$, $R^{10}$, $R^{11}$, $R^{12}$, and $R^{13}$ are each independently H, $C_{1-10}$ alkyl, $C_{6-18}$ aryl, $C_{6-18}$ aralkyl, SO$_3$H, —SO$_3^-$M$^+$, —COOH, —COO$^-$M$^+$, —PO$_3$H$_2$, —PO$_3^{H-}$M$^+$, —PO$_3^{2-}$M$_2^+$, or —PO$_3^{2-}$M$^{2+}$;

M is a metal, ammonium, or alkylammonium; and j is an integer from 0 to 30;

with the proviso that when j>1, the $Y^2$ between sequential aromatic rings are the same or different; the $R^5$, $R^6$, $R^7$, $R^8$, and $R^9$ on sequential aromatic rings are the same or different; and at least one of $R^5$, $R^6$, $R^7$, $R^8$, $R^9$, $R^{10}$, $R^{11}$, $R^{12}$, and $R^{13}$ is —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$, wherein at least one of A, B, or C comprises a component selected from the group consisting of polymer segments having formulae 8, 9, 10, and 11, and salts thereof:

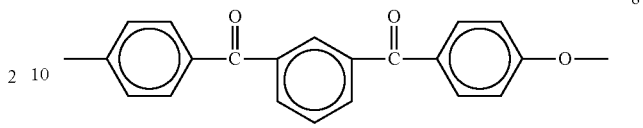
8

9

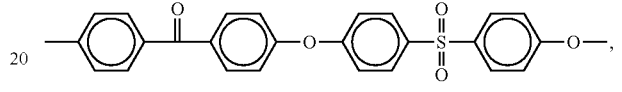
10

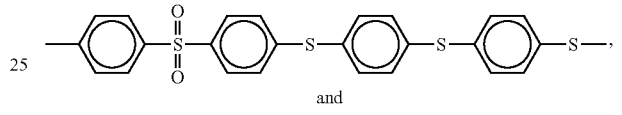
and

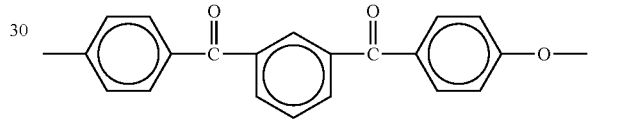
11

2. The block copolymer of claim 1 wherein polymer blocks $A_m$ and $C_s$ is hydrophobic and the polymer block $B_n$ is hydrophilic.

3. The block copolymer of claim 2 wherein the block copolymer has a micro-phase separated morphology.

4. The block copolymer of claim 1 having a micro-phase separated morphology comprising spheres, cylinders, lamellae, ordered bicontinuous double diamond structures, disordered bicontinuous morphologies, and combinations thereof.

5. The block copolymer of claim 1 wherein polymer blocks $A_m$, $B_n$, and $C_s$ each individually have a molecular weight from about $5 \times 10^2$ to about $5 \times 10^5$ (g/mol).

6. An ion conductive membrane comprising the block copolymer of claim 1.

7. A polymer block $B_n$ comprising a polymer segment B that is repeated n times, wherein n is an integer from 1 to 200 and B comprises a component selected from the group consisting of polymer segments having formulae 4, 5, 6a, 6b, 6c, 6d, and 6e, and salts thereof:

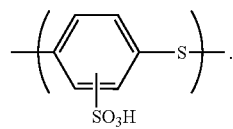
4

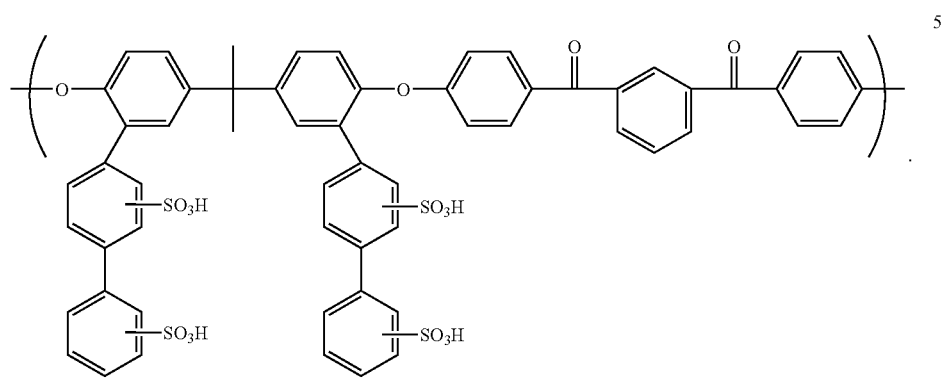

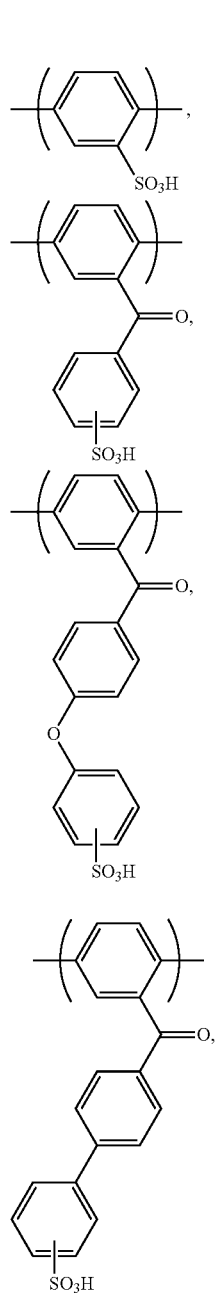

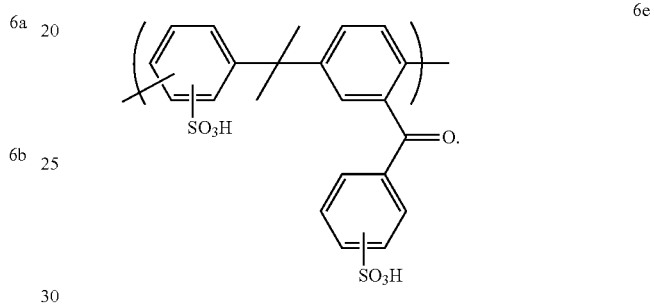

8. The polymer block of claim 7 having a molecular weight from about $5 \times 10^2$ to about $5 \times 10^5$ (g/mol).

9. An ion conductive membrane comprising the polymer block of claim 7.

10. A block copolymer having formula 1a or formula 1b:

$$(A_m B_n)_p \qquad \qquad 1a$$

$$A_m B_n C_s \qquad \qquad 1b$$

wherein
- A is a first polymer segment that is repeated m times to form first polymer block $A_m$ that is either hydrophobic or hydrophilic;
- B is a second polymer segment that is repeated n times to form second polymer block $B_n$ that is either hydrophobic or hydrophilic;
- C is a third polymer segment that is repeated s times to form third polymer block $C_s$ that is either hydrophobic or hydrophilic;
- m, n, and s are each independently an integer from 1 to 200; and
- p is an integer from 1 to 20;
- wherein at least one of A, B, or C comprises a component selected from the group consisting of polymer segments having formulae 4, 5, 6a, 6b, 6c, 6d, and 6e:

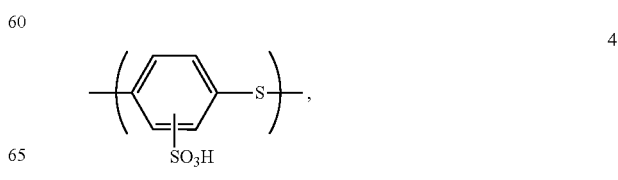

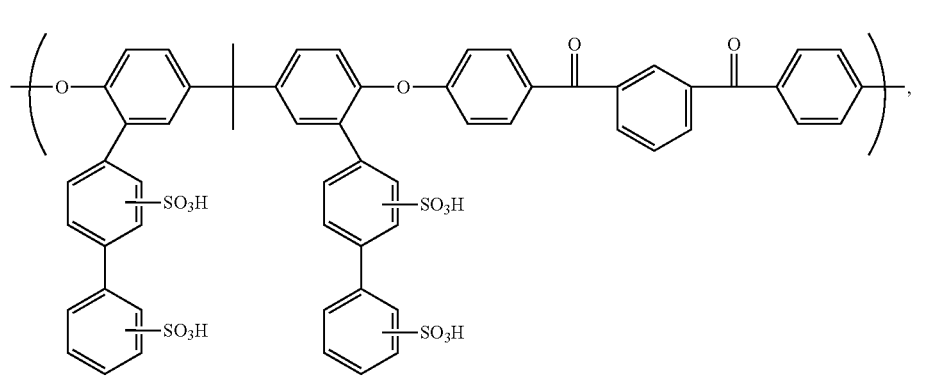
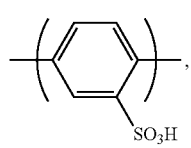
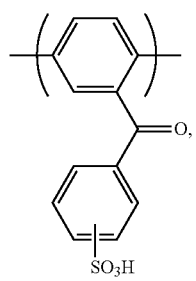
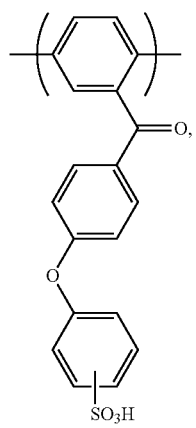
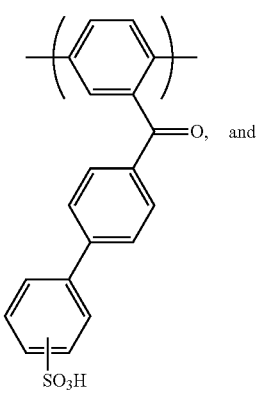
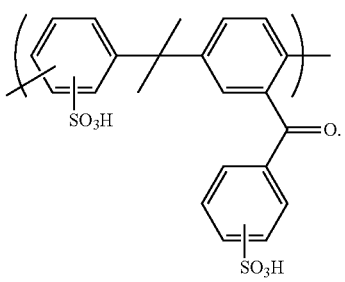
11. The block copolymer of claim 10 wherein polymer blocks $A_m$, $B_n$, and $C_s$ each independently have a molecular weight from about $5 \times 10^2$ to about $5 \times 10^5$ (g/mol).
12. An ion conductive membrane comprising the block copolymer of claim 10.
* * * * *